May 20, 1969      D. R. BAILEY      3,444,944

SCALE POTENTIOMETER MOUNTING

Filed Sept. 7, 1966

INVENTOR
Don R. Bailey

BY *Hovey, Schmidt, Johnson & Hovey*
ATTORNEYS.

United States Patent Office 3,444,944
Patented May 20, 1969

3,444,944
SCALE POTENTIOMETER MOUNTING
Don R. Bailey, Webb City, Mo., assignor to Cardinal Scale Manufacturing Co., Webb City, Mo., a corporation of Missouri
Filed Sept. 7, 1966, Ser. No. 577,708
Int. Cl. G01g 7/00, 23/36
U.S. Cl. 177—210
3 Claims

ABSTRACT OF THE DISCLOSURE

The pointer shaft of a scale dial head is connected to the rotor of a circular potentiometer to provide a linear analog signal representing the scale indication of the dial head. A protruding bearing is employed as a centering guide in the mounting of the housing of the potentiometer to a frame member of the scale mechanism, in order to align the axis of the shaft and the axis of the potentiometer tracks to assure that the increased drag on the scale mechanism will be uniform.

---

This invention relates to scale dial heads which utilize a potentiometer to provide a linear analog signal directly proportional to the dial indication and, more specifically, to a mounting for such a potentiometer which assures that the increased drag on the scale mechanism caused by the potentiometer will be uniform throughout the scale range.

Scale potentiometers are utilized in various applications where a linear analog signal is desired which represents the scale indication of a dial head. Examples of applications include the use of the signal as a cutoff signal to operate apparatus that controls the loading of material being weighed, the use of the signal for recording purposes, or for the purpose of operating another dial at a remote location. A problem is presented, however, in the modification of existing dial heads which were assembled and sealed without including a potentiometer takeoff, in that the subsequent addition of a potentiometer to the head mechanism has required resealing of the head and modification of the head structure. In practice, therefore, it has been impractical to modify the dial head, thereby making it necessary for users of scale equipment to purchase an entire head assembly initially equipped with a potentiometer if it is desired to add this feature to existing scale equipment.

It is, therefore, the primary object of this invention to provide a scale potentiometer mounting which enables a dial head to be modified to accommodate a potentiometer without altering the head structure or resealing the head.

As a corollary to the foregoing object, it is an important aim of this invention to provide a potentiometer mounting which assures that the axis of the scale pointer shaft and the axis of the resistive track in the potentiometer, when the latter is mounted on the head, will be common in order to introduce a uniform drag into the scale mechanism over the entire scale range. Inherently, the addition of a potentiometer to an existing dial head introduces drag which is uncompensated because of the friction between the potentiometer wiper and the resistive track which is necessary to provide good electrical contact. In a dial head which includes a potentiometer as original equipment, it is manifest that by proper design and construction of the head coaxial alignment of the track and the pointer shaft is readily achieved. In factory or field modifications, however, difficulty has been encountered heretofore in obtaining proper alignment with certainty by a simple mounting technique which, when effected by trained personnel, will provide the necessary alignment without resealing the head.

It is, therefore, an important object of this invention to provide a simple and expedient means of effecting a factory or field modification as aforesaid which obviates the need to reseal the head and assures that uniform correction will be introduced into the scale mechanism throughout the dial range.

A further object is to provide a potentiometer housing having a circular mounting aperture therein disposed in concentric relationship to the resistive track of the potentiometer and which receives a protruding, annular bearing that journals the pointer shaft, thereby assuring that the shaft and the track will be maintained in coaxial relationship.

Figure 1:
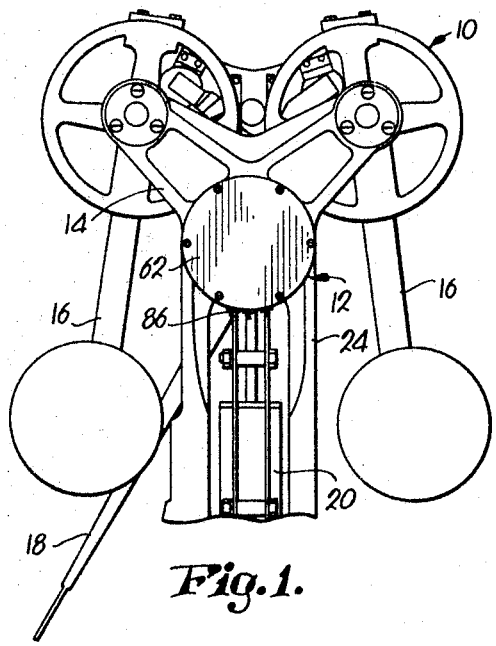
FIGURE 1 is a rear elevational view of the internal mechanism of a scale dial head showing a potentiometer secured to the frame of the mechanism.
Figure 4:
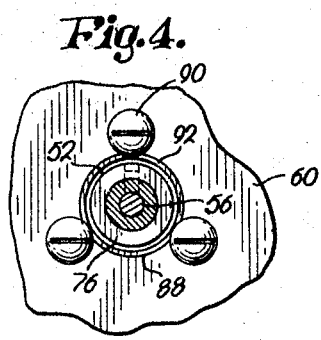
FIG. 4 is a vertical, sectional view taken along line 4—4 of FIG. 2.
Figure 3:
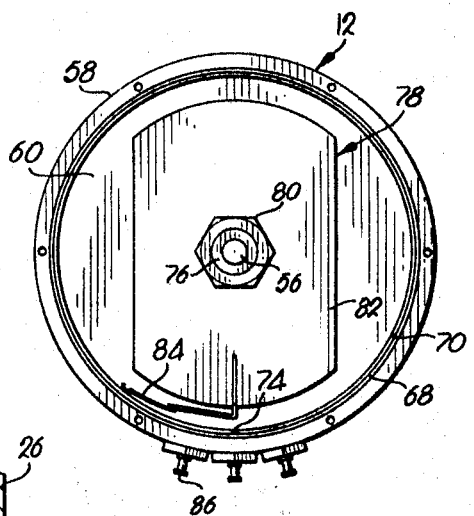
FIG. 3 is a rear elevational view of the potentiometer with the cover thereof removed.
Figure 2:
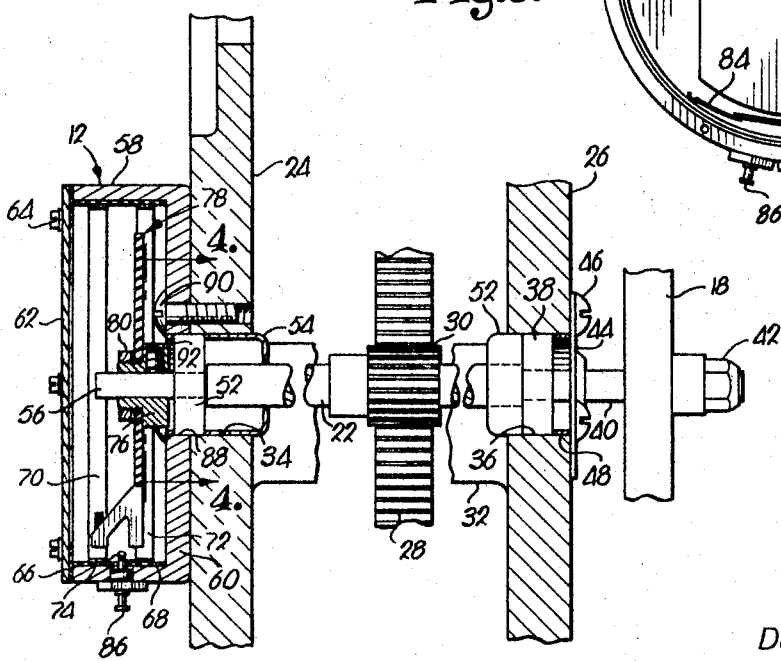
FIG. 2 is a vertical, sectional view taken in a plane through the pointer shaft showing the potentiometer and associated parts of the scale mechanism in detail.

Referring to FIG. 1, a double pendulum scale mechanism 10 of a dial head is illustrated, together with the housing 12 of a scale potentiometer which is secured to the supporting frame 14 of mechanism 10. The mechanism is of conventional design and includes a pair of balance arm shafts 16, a dial pointer 18, and an oil dashpot 20 for controlling pointer 18. FIGURES 2–4 reveal the pointer shaft 22 which extends between and is supported by a pair of upright members 24 and 26 forming a part of frame 14. Shaft 22 is driven in the conventional manner by a rack 28 in mesh with a pinion 30 rigid with the central portion of shaft 22.

Members 24 and 26 are interconnected by a cross member 32 and have circular openings 34 and 36 therein in horizontal alignment. A ball bearing 38 is disposed in opening 36 and coaxially receives a reduced end portion 40 of shaft 22 to which pointer 18 is secured by a nut 42. A bearing cap 44 is secured to the right side of member 26 (as viewed in FIG. 2) by three screws 46, an annular spacer 48 being disposed between cap 44 and bearing 38 in engagement with the outer race of the bearing. A protective cup 50 is inserted into the opposite side of opening 36 and is held in place by an interference fit, thereby preventing movement of bearing 38 axially of shaft 22.

A second annular ball bearing 52 is disposed in opening 34 of member 24, a protective cup-like element 54 extending into opening 34 and engaging the outer race of bearing 52 as illustrated. Cup 54 is held in place by an interference fit, the left end portion 56 (as viewed in FIG. 2) of shaft 22 being reduced in diameter and coaxially received by bearing 52. Thus, movement of bearing 52 axially of the shaft away from end 56 is positively precluded.

The potentiometer housing 12 has a cylindrical body section 58 closed at one end by an integral plate section 60. A cover 62 is secured by screws 64 to the opposite end of body section 58, an annular gasket 66 being sandwiched between body section 58 and cover 62.

The internal surface of body section 58 is provided with a cylindrical, insulated lining 68 upon which a pair of axially spaced, circular tracks 70 and 72 are secured. Track 70 is composed of a material having a relatively high electrical resistance per unit length, a separation 74 in track 70 being apparent in FIGS. 2 and 3. Track 72, on the other hand, is composed of a highly conductive substance such as silver or copper and presents a continuous ring.

A collar 76 is secured to end 56 of shaft 22 by a set-screw and has a reduced, threaded portion which forms the hub of a rotor 78 secured thereto by a nut 80. Rotor 78 includes a flat, plate-like insulated arm 82 and a dual brush 84 secured to the periphery of arm 82. Brush 84 presents pair of resilient electrical contacts which engage and ride along tracks 70 and 72 as shaft 22 is rotated. Electrical connections to the tracks are made via three terminals 86, one of which is connected to the conductive track 72. The two remaining terminals are connected to respective ends of the resistive track 70 adjacent separation 74.

Plate section 60 has a central, circular aperture 88 therein disposed in coaxial relationship to tracks 70 and 72. Aperture 88 is of a diameter to complementally receive the outer race of bearing 52, it being noted that a portion (approximately one-half) of bearing 52 projects beyond opening 34 and into aperture 88. Plate section 60 of housing 12 is held flush with member 24 and secured thereto by three threaded fasteners 90, the heads of the fasteners being of sufficient diameter to slightly overlap aperture 88. An annular spacer 92 engages the outer race of bearing 52 within aperture 88 and is sandwiched between the bearing and the heads of fasteners 90 when the latter are tightened into mating, tapped holes in member 24. Thus, bearing 52 is effectively clamped between spacer 92 and cup element 54 to prevent displacement of the bearing axially of shaft 22.

Assuming for the moment that the dial head was initially assembled and sealed without the potentiometer being mounted on frame member 24, a bearing cap similar to cap 44 would be attached to the left side of member 24 (as viewed in FIG. 2) with bearing 52 shifted to a position entirely within the confines of opening 34. Spacer 48 would be removed from opening 36; therefore, each bearing would be held between its associated bearing cap and protective cup in conventional fashion.

When it is desired to modify the head to include a potentiometer takeoff, both the front bearing cap 44 and the rear bearing cap are removed, the rear cap being discarded. Spacer 48 is inserted into opening 36 and bearing cap 44 is replaced. This necessarily causes pointer shaft 22 to shift leftwardly as seen in FIG. 2, thereby displacing bearing 52 to the position shown where a portion thereof extends beyond opening 34.

With the potentiometer disassembled and cover 62 removed from body section 58 of housing 12, aperture 88 is slipped over the protruding bearing 52 and the housing is secured to member 24 by fasteners 90. At this juncture, it will be appreciated that the axis of shaft 22 and the axis of tracks 70 and 72 are common. Collar 76 is then secured to shaft end 56 and rotor 78 is mounted thereon and held in place by nut 80.

The dual brush 84 is adjusted for minimum drag with sufficient pressure to assure good electrical contact as the brush traverses tracks 70 and 72. By utilizing the protruding bearing 52 as a centering guide in the mounting of the potentiometer housing to member 24, it is assured that the drag will be uniform over the entire sweep of the rotor. Additionally, it is unnecessary to bore any holes or modify the existing structure of the scale mechanism in any way other than to shift the pointer shaft slightly as discussed above.

Having thus described the invention, what is claimed as new and desired to be secured by Letters Patent is:
1. In a scale dial head:
   a pair of spaced, side-by-side frame members having aligned openings therethrough;
   a rotatable shaft spanning said members, extending through said openings, and having a pair of opposed ends projecting beyond respective openings;
   a dial pointer mounted on one of said projecting ends for rotation with said shaft;
   a first bearing in the opening in the member from which said one end of the shaft projects, said first bearing receiving and rotatably supporting the shaft;
   a second, annular bearing in the opening in the other member from which the other of said ends of the shaft projects, said second bearing coaxially receiving said shaft and having a circumferential periphery circumscribing the shaft;
   said second bearing having a portion thereof extending beyond said opening in the other member axially of the shaft and toward said other end of the latter;
   a potentiometer having a housing, a circular, resistive track in said housing, and a rotor engaging said track;
   structure attaching said rotor to said other end of the shaft for movement of the rotor along said track upon rotation of the shaft;
   said housing having a circular aperture therein disposed in concentric relationship to said track and complementally receiving said portion of the second bearing, whereby the axis of the shaft and the axis of said track are common; and
   means coupled to the shaft between said members for rotating the shaft in response to the weight of a load being weighed.
2. The invention of claim 6,
   there being an element in said opening in the other member engaging said second bearing and preventing displacement of the second bearing away from said other end of the shaft; and
   means in said housing engaging said second bearing and holding the latter against said element, whereby the second bearing is clamped between said holding means and said element to preclude shifting of the second bearing axially of the shaft.
3. The invention of claim 2,
   said holding means including a fastener securing said housing to said other member.

References Cited

UNITED STATES PATENTS 3,181,633   5/1965   Worst _____ 235—61
3,281,684   10/1966  Reeds _____ 340—266

ROBERT S. WARD, *Primary Examiner.*

L. HAMBLEN, *Assistant Examiner.*

U.S. Cl. X.R.

177—216, 245